United States Patent
Lee

(10) Patent No.: US 12,552,230 B2
(45) Date of Patent: Feb. 17, 2026

(54) WIND DIRECTION CONTROLLING DEVICE OF SLIM-TYPE AIR VENT FOR AUTOMOBILE

(71) Applicant: NIFCO KOREA INC., Asan-si (KR)

(72) Inventor: Ji Hun Lee, Asan-si (KR)

(73) Assignee: NIFCO KOREA INC., Asan-si (KR)

( * ) Notice: Subject to any disclaimer, the term of this patent is extended or adjusted under 35 U.S.C. 154(b) by 586 days.

(21) Appl. No.: 17/776,804

(22) PCT Filed: Sep. 10, 2020

(86) PCT No.: PCT/KR2020/012224
§ 371 (c)(1),
(2) Date: May 23, 2023

(87) PCT Pub. No.: WO2021/096044
PCT Pub. Date: May 20, 2021

(65) Prior Publication Data
US 2023/0286355 A1   Sep. 14, 2023

(30) Foreign Application Priority Data

Nov. 15, 2019 (KR) .......................... 10-2019-0146943

(51) Int. Cl.
*B60H 1/34* (2006.01)
(52) U.S. Cl.
CPC ... *B60H 1/3414* (2013.01); *B60H 2001/3464* (2013.01)
(58) Field of Classification Search
CPC .......... B60H 1/3414; B60H 2001/3464; B60H 1/3421
See application file for complete search history.

(56) References Cited

U.S. PATENT DOCUMENTS 5,176,567 A * 1/1993 Piritore ................. F24F 13/072
454/305
11,491,844 B2 * 11/2022 Hoerschler .......... B60H 1/3414
(Continued)

FOREIGN PATENT DOCUMENTS

CN        103029552 A     4/2013
CN        108638801 A    10/2018
(Continued)

OTHER PUBLICATIONS

International Search Report and Written Opinion for PCT/KR2020/012224 dated Nov. 30, 2020.

*Primary Examiner* — Ko-Wei Lin
(74) *Attorney, Agent, or Firm* — KDW Firm PLLC

(57) ABSTRACT

The present invention relates to a wind direction controlling device of a slim-type air vent for an automobile. More specifically, an air distributor and an air guide are mounted to an air duct of the slim-type air vent to make it easy to adjust the discharge volume and the vertical discharge angle of air discharged through a discharge portion of the air duct. The present invention comprises: a slim air duct (100) having an air inlet (110) and an air outlet (120) which pass therethrough, wherein air generated in an air conditioning device flows in through the air outlet (120) and then is discharged to the outside through the air outlet (120); an air distributor (200) rotatably installed inside the slim air duct (100); and an air guide (300) installed and fixed inside the air duct (100) so that the air distributed by the air distributor (200) is discharged through the air outlet (120) as the Coanda effect is generated in the upward-forward and downward-forward directions.

3 Claims, 5 Drawing Sheets

(56) References Cited

U.S. PATENT DOCUMENTS

| | | | | |
|---|---|---|---|---|
| 2016/0361977 A1* | 12/2016 | Freese | ................ | B60H 1/00678 |
| 2018/0056756 A1* | 3/2018 | Schaal | ................... | F24F 13/10 |
| 2018/0319255 A1* | 11/2018 | Bastian | ................ | B60H 1/3421 |
| 2019/0270363 A1* | 9/2019 | Hoerschler | ........... | B60H 1/3414 |
| 2019/0322153 A1* | 10/2019 | Kim | ................... | B60H 1/00685 |
| 2019/0329630 A1* | 10/2019 | Ren | ...................... | B60H 1/3414 |
| 2020/0164721 A1* | 5/2020 | Flothmann | ........... | B60H 1/3421 |

FOREIGN PATENT DOCUMENTS

| | | | | |
|---|---|---|---|---|
| CN | 108705919 | A | 10/2018 | |
| CN | 109823143 | A | 5/2019 | |
| CN | 109863047 | A | 6/2019 | |
| DE | 102017113906 | A1 * | 8/2017 | ........... B60H 1/3414 |
| DE | 102016225128 | A1 | 6/2018 | |
| DE | 202020106237 | U1 | 1/2021 | |
| EP | 3418092 | A1 | 12/2018 | |
| JP | 2017065348 | A | 4/2017 | |
| KR | 20150109945 | A | 10/2015 | |
| KR | 20180072187 | A | 6/2018 | |
| KR | 20190034732 | A | 4/2019 | |
| KR | 102027412 | B1 | 10/2019 | |
| KR | 20190121963 | A | 10/2019 | |

\* cited by examiner

WIND DIRECTION CONTROLLING DEVICE OF SLIM-TYPE AIR VENT FOR AUTOMOBILE

TECHNICAL FIELD

The following description relates to a wind direction controlling device for a slim-type air vent for an automobile. More specifically, an air distributor and an air guide are mounted to an air duct of a slim-type air vent to make it easy to adjust the discharge volume and the vertical discharge angle of air discharged through a discharge portion of the air duct.

BACKGROUND ART

In general, an air vent that operates with an air conditioning system for automobiles to discharge air into the interior of an automobile includes a center air vent mounted on the center fascia panel in front between the driver's seat and the front passenger's seat, and a side vent mounted on the crash pad in front of the driver's seat and front passenger's seat.

A conventional air vent for vehicles, as shown in FIG. 1, includes a plurality of horizontal wings 11 and vertical wings 12 each rotatably mounted on the outlet of an air duct 10, wherein one of the plurality of horizontal wings 11 has a wind direction controlling knob 13 for adjusting the up and down angles of the horizontal wings 11 and the left and right angles of the vertical wings 12. (See Korean Patent Publication No. 10-2019-0034732 (published date: Apr. 3, 2019))

As the conventional air vent for automobiles adopts at least six horizontal wings 11 and vertical wings 12 respectively with a wide vertical width, the direction of air discharged toward passengers (e.g., lower direction toward the navel and upper direction toward the face) in the automobile may be easily adjusted, but the large size of the air vent 10 may cause a package issue with surrounding parts and design constraints.

Furthermore, as horizontal wings 11 and vertical wings in the conventional air vent 10 are inevitably exposed to the outside, a large space in the center fascia panel or crash pad is occupied, eventually degrading freedom in design of clusters and Audio, Video, Navigation (AVN) devices arranged around the air vent 10.

Therefore, the recent enlargement of clusters and AVN devices mounted in the interior of an automobile pushes, to the lower area of the center fascia panel, the position to install the air vent discharging air upon operation of the air conditioner and heater. In particular, the recent exterior design of the air vent is being designed to be slim type.

Accordingly, automobiles use a slim-type air vent in which only a single horizontal wing is exposed to the outside to improve design of the clusters and AVN devices.

The slim-type air vent has a longer horizontal length and a smaller vertical height width, compared to the conventional air vent, providing advantages, such as a smaller installation space and greater freedom for peripheral parts (e.g., clusters and AVN devices, etc.). However it may not be easy to adjust the direction of air discharged inside the automobile upward and downward.

The slim-type air vent requires a damper for the air vent to be separately installed inside a duct so that a passenger in the vehicle may adjust the wind direction of the air generated by the air conditioner and the heater, which unfortunately increases the number of parts for the assembly of the air vent, degrading assemblability and increasing manufacturing cost.

DISCLOSURE OF THE INVENTION

Technical Goals

An aspect provides a wind direction controlling device of a slim-type air vent for an automobile, in which an air distributor rotatably is installed inside an air duct for a slim-type air vent, and an air guide is fixed so that the air distributed by the air distributor is discharged through an air outlet as the Coanda effect is generated in the upward-forward and downward-forward directions. Therefore, the wind direction controlling device may discharge, into the interior of an automobile, the air which flows into the slim-type air duct depending on the rotating state of the air distributor, in a state where the air guide controls the directions of air to be up and down and air volume.

Technical Solutions

To achieve the above object, the present disclosure includes a slim-type air duct 100 having an air inlet 110 and an air outlet 120, which pass through the slim-type air duct 100, wherein air generated by an air conditioning device flows in through the air inlet 110 and then is discharged to the outside through the air outlet 120, an air distributor 200 rotatably installed inside the slim-type air duct 100, and an air guide 300 installed and fixed inside the air duct 100 so that the air distributed by the air distributor 200 is discharged through the air outlet 120 as the Coanda effect is generated in the upward-forward and downward-forward directions.

The air distributor 200 has a cylindrical body, that is, a body 210, having an air inflow unit 211 through which air flows in, and a hinge shaft 220 protruding on both left and right sides of the body 210, and a plurality of air passages 230 penetrating in the lateral direction of the body 210 that rotates around the hinge shaft 220.

In addition, the air guide 300 has a contact surface 310 curvedly on one side and having the same outer diameter as the outer diameter of the body 210 of the air distributor 200 and a symmetrical airfoil 320 protruding curvedly on the other side.

The air passages 230 in the body 210 rotating while contacting a contact surface 310 open and close depending on the position contacting the contact surface 310 to provide air to one of the upper and lower slim-type air duct 100 or to both.

In addition, as the air inlet 110 of the slim-type air duct 100 opens and closes depending on rotating states, the air distributor 200 is installed to adjust air that flows into the inside of the slim-type air duct 100.

Advantageous Effects

According to the present invention, as air passages open and close depending on the rotation of an air distributor, air that flows in a slim-type air duct is discharged more smoothly to the inside of the automobile, with the direction of the air controlled by the air guide.

According to the present invention, the volume of air flowing into the slim-type air duct is controlled in accordance with the rotational state of the air distributor, which decreases the number of parts for the assembly of the slim-type air vent, improving assemblability and decreasing manufacturing cost.

Hereinafter, the technical configuration of the present invention will be described in detail with reference to the accompanying drawings.

Figure 1:
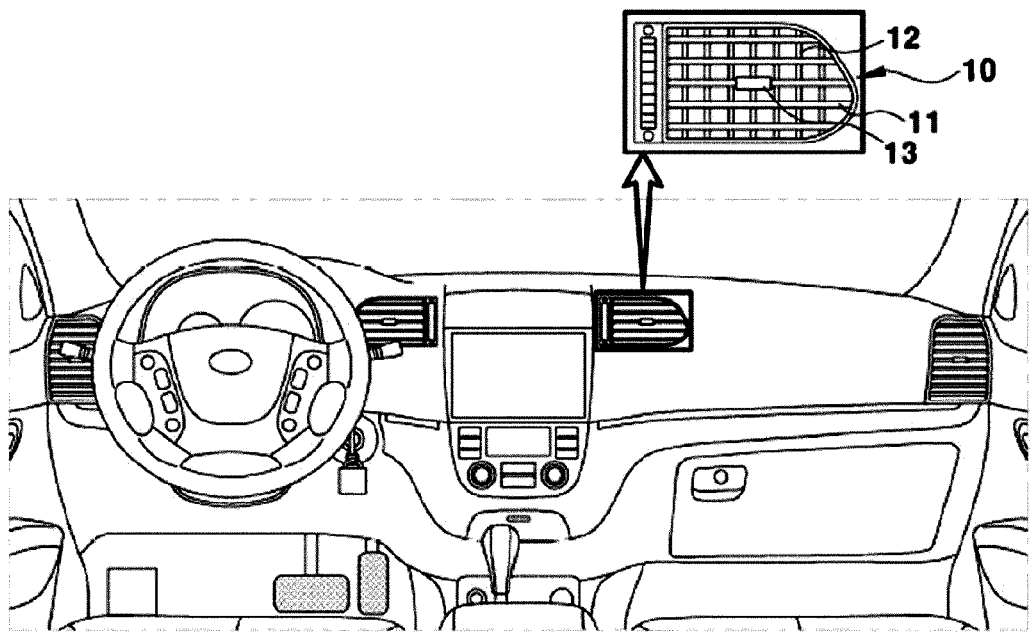
FIG. 1 is a front view illustrating a state in which an air vent for a conventional vehicle is installed.
Figure 2:
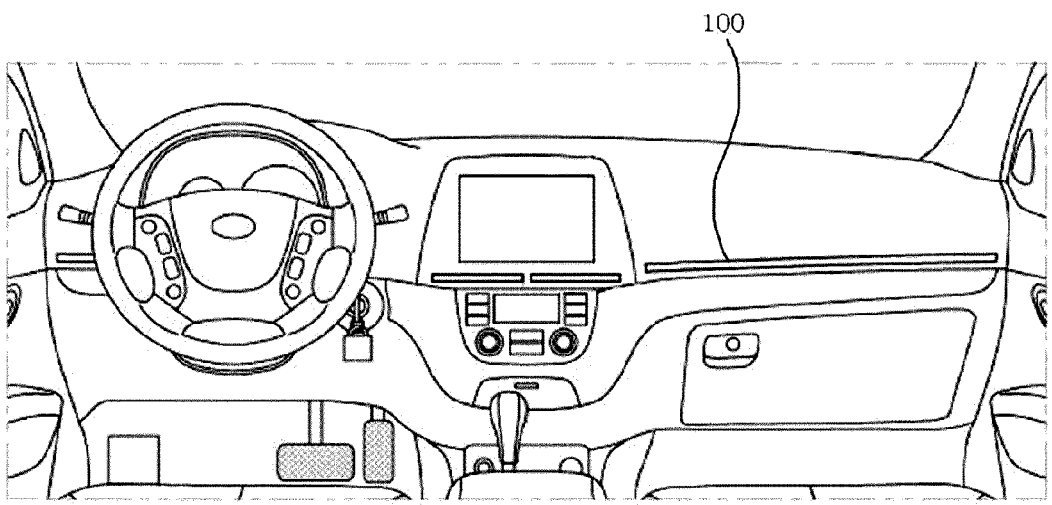
FIG. 2 is a front view illustrating a state in which a slim-type air vent for a vehicle is installed according to the present invention.
Figure 3:
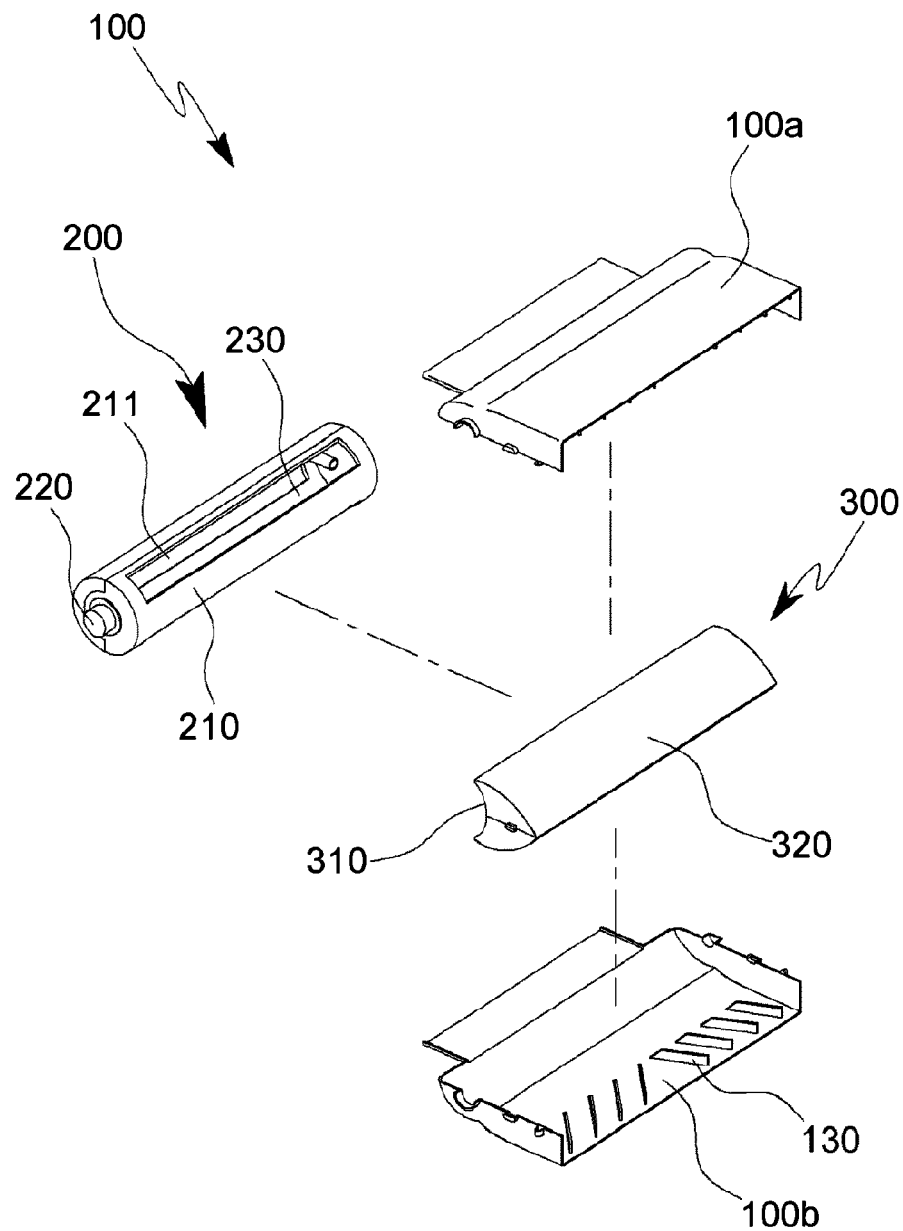
FIG. 3 is an exploded perspective view illustrating the configuration of a wind direction controlling device of a slim-type air vent for a vehicle according to the present invention.
Figure 4:
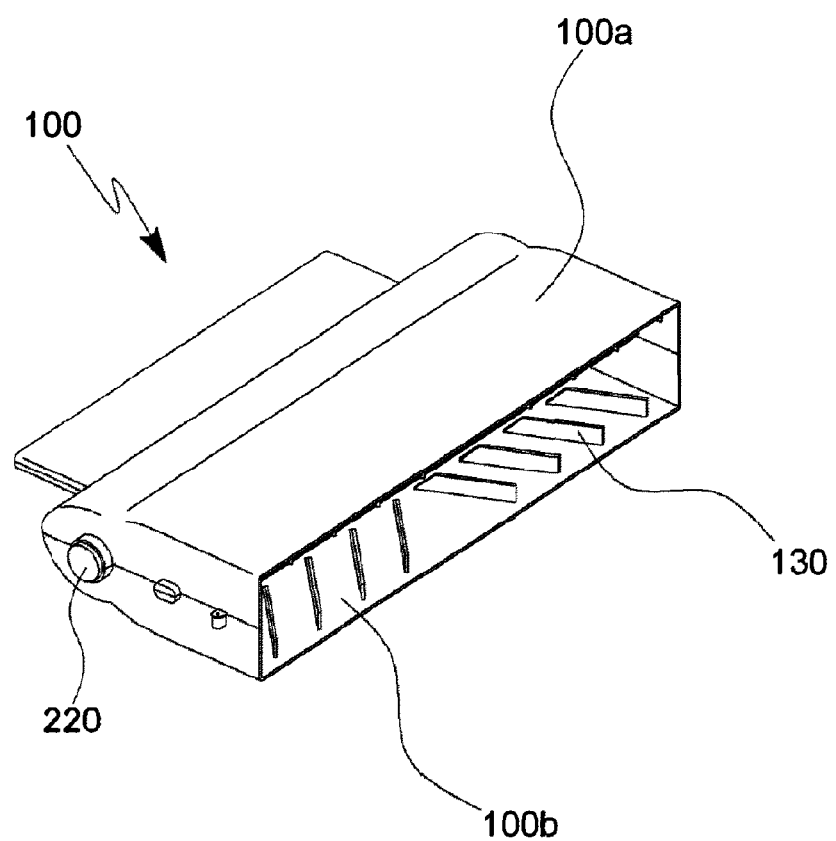
FIG. 4 is a perspective view illustrating a wind direction controlling device of a slim-type air vent for an automobile according to the present invention.
Figure 6:
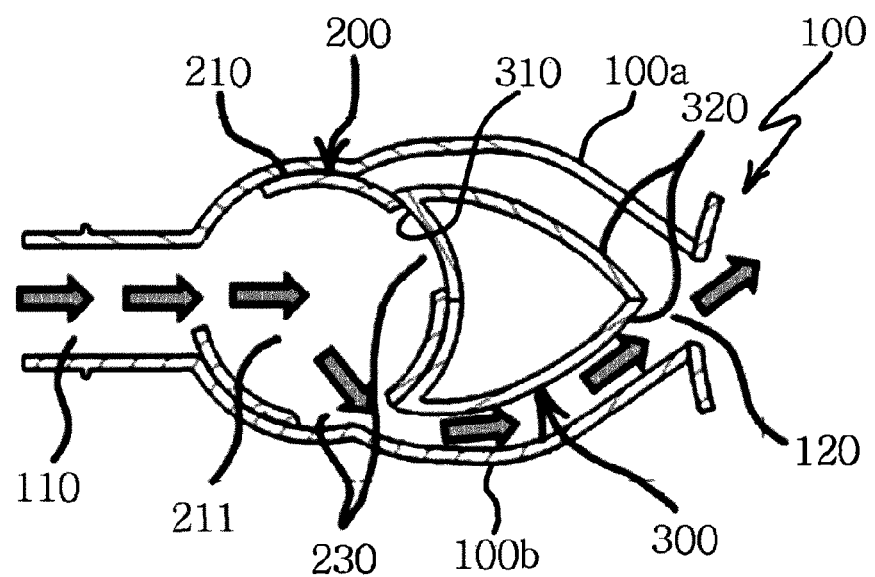
FIG. 6 is a schematic cross-sectional view illustrating a state in which a wind direction controlling device of a slim-type air vent for a vehicle according to the present invention is operated to discharge air upward.
Figure 7:
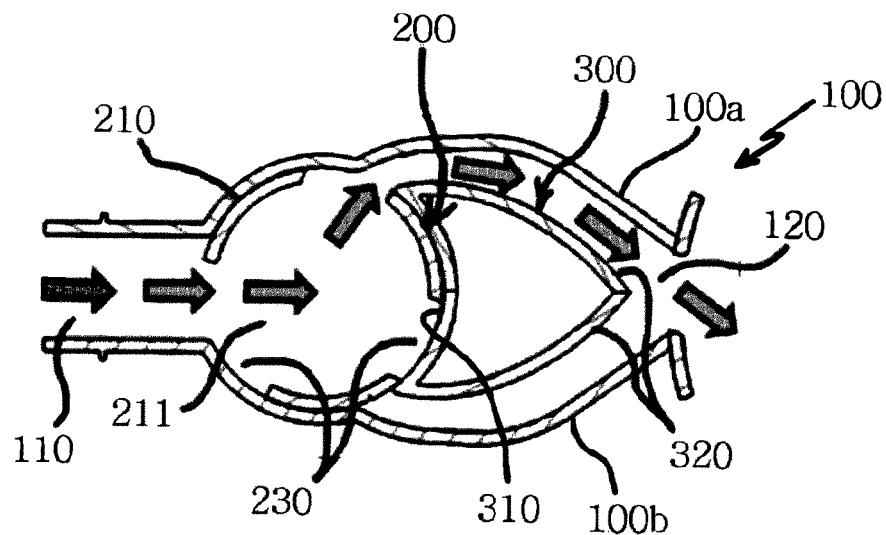
FIG. 7 is a schematic cross-sectional view illustrating a state in which a wind direction controlling device of a slim-type air vent for a vehicle according to the present invention is operated to discharge air downward.
Figure 8:
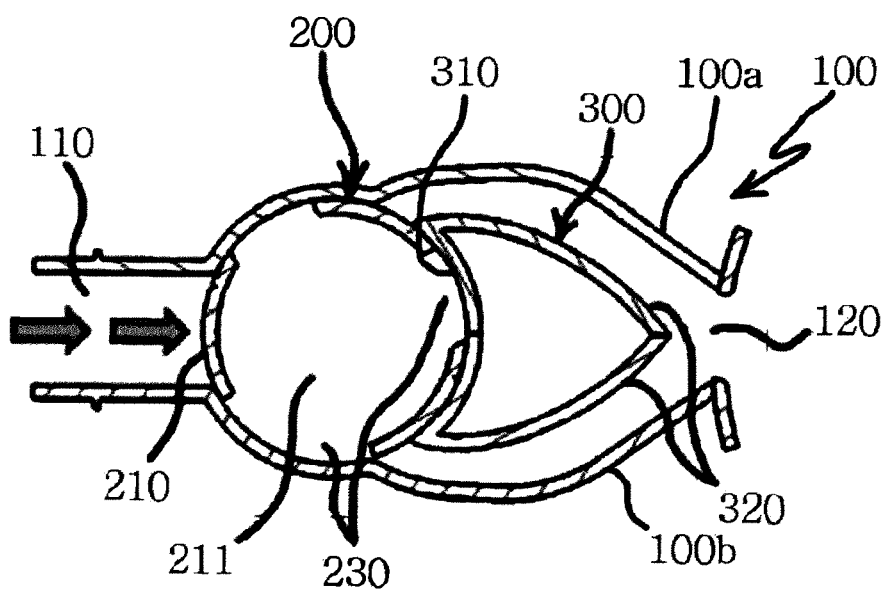
FIG. 8 is a schematic cross-sectional view illustrating a state in which a wind direction controlling device of a slim-type air vent for a vehicle according to the present invention is operated not to discharge air through an air outlet and the best form for the example embodiments of the present disclosure.

FIG. 2 is a front view showing a state in which a slim-type air vent for a vehicle is installed according to the present disclosure, FIG. 3 is an exploded perspective view showing the configuration of a wind direction controlling device of the slim-type air vent for a vehicle according to the present disclosure, FIG. 4 is a perspective view illustrating the slim-type air vent for a vehicle according to the present disclosure, FIG. 6 is a schematic cross-sectional view showing a state in which the wind direction controlling device of the slim-type air vent for a vehicle according to the present invention is operated to discharge air upward, FIG. 7 is a schematic cross-sectional view showing a state in which the wind direction controlling device of the slim-type air vent for a vehicle according to the present invention is operated to discharge air downward, and FIG. 8 is a schematic cross-sectional view showing the state in which the wind direction controlling device of the slim-type air vent for a vehicle according to the present invention is operated not to discharge air through an air outlet.

As shown in FIGS. 2 to 8, the wind direction controlling device of the slim-type air vent for a vehicle according to the present invention includes a slim-type air duct 100 having an air inlet 110 and an air outlet 120, which pass therethrough, wherein air generated by an air conditioning device flows in through the air inlet 110 and then is discharged to the outside through the air outlet 120, an air distributor 200 rotatably installed inside the slim-type air duct 100, and an air guide 300 installed and fixed inside the air duct 100 so that the air distributed by the air distributor 200 is discharged through the air outlet 120 as the Coanda effect is generated in the upward, downward, and forward directions.

In this case, the slim-type air duct 100 is composed of an upper duct 100a having an open lower part and a lower duct 100b having an open upper part, where both the upper duct 100a and the lower duct 100b are to be assembled. The upper duct 100a is assembled with the lower part 100b with the air distributor 200 and the air guide 300 installed therein to make each of the air distributor 200 and the air guide 300 operable in the slim-type air duct 100.

The air distributor 200, as shown in FIGS. 5 to 8, includes a body 210 in a cylindrical shape having an air inflow unit 211 through which air flows in, a hinge shaft 220 protruding on the left and right sides of the body 210, and a plurality of air passages 230 penetrating in the lateral direction of the body 210 that rotates around a hinge shaft 220. Therefore, the air generated by an air conditioning device (not shown) flows in the air inflow unit 211 inside the body 210 through the air inlet 110 of the slim-type air duct 100 as the air passages 230 open and close according to the rotation amount of the body 210, and the air that flows in the air inflow unit 211 through the air inlet 110 is discharged while moving in the direction of the air outlet 120 of the slim-type air duct 100 through another air passage 230 in the body 210.

In addition, as shown in FIGS. 5 to 8, the air guide 300 has curvedly on one side a contact surface 310 having the same outer diameter as the outer diameter of the body 210 of the air distributor 200 and a symmetrical airfoil 320 protruding curvedly on the other side. The air passages 230 in the body 210 of the air distributor 200 open and close depending on the position of the air passages 230 in contact with the contact surface 310, thereby distributing the air moving in the direction of the air outlet 120 of the slim-type air duct 100 upward or downward, or shutting off the air. While the air is moving in the direction of the air outlet 120 of the slim-type air duct 100 through the air passages 230, the symmetrical airfoil 320 induces the air to generate the Coanda effect to discharge the air selectively forward or upward and downward through the air outlet 120.

As the air passage 230 in the body 210 that rotates while being in contact with the contact surface 310 opens and closes depending on position of the air passage 230 in contact with the contact surface 310, the air passage 230 may be positioned to supply the air to one of the upper and lower slim-type air duct 100 or to both.

In addition, the air distributor 200 is configured to adjust the volume of air flowing in the internal slim-type air duct, that is, slim-type air duct 100, as the air inlet 110 of the slim-type air duct 100 opens and closes depending on a rotational state of the air distributor 200.

The slim-type air duct 100 has a longer horizontal length and a shorter vertical height, compared to the conventional air vent duct.

For reference, an unexplained reference numeral 130 in FIG. 2 indicates a guide rib which rotates left and right by a separate mechanism (not shown) for controlling the right and left wind directions, and the detailed description thereof will be omitted since it departs from the essence of the present invention.

The slim-type air duct 100 of the present invention configured as described herein is composed of the upper duct 100a having an open lower portion and the lower duct 100b having an open upper portion, wherein they are assembled in a longer horizontal length and a shorter vertical height, compared to the conventional air vent duct.

Such a structure of the assembly provides a greater space to install clusters and Audio, Video, Navigation (AVN)

devices mounted on the center fascia panel or crash pad than before and improves freedom of design of clusters and AVN devices.

The air distributor 200 is installed in the air inlet 110 direction on one side in the slim-type air duct 100 formed by assembling the upper duct 100a with the lower duct 100b and the air guide 300 is installed and fixed in the air outlet 120 direction on the side in the slim-type air duct 100 formed by assembling the upper duct 100a with the lower duct 100b so that the air guide 300 is not exposed to the air outlet 120 of the slim-type air duct 100 to be aesthetically pleasing.

Figure 5:
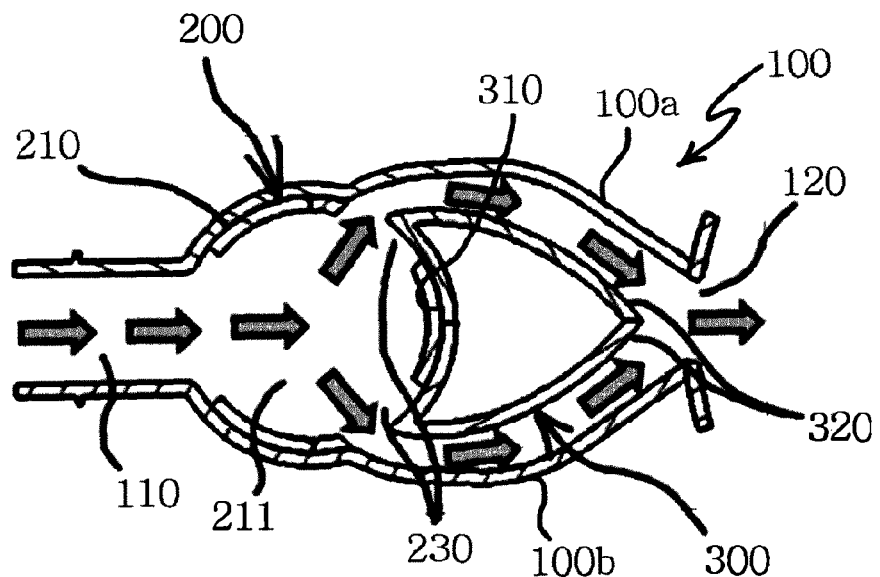

In addition, where a passenger on board wants to adjust a wind direction to discharge the air generated by an air conditioning device (not shown) in the upward or downward direction, or forward direction of the air outlet 120 of the slim-type air duct 100, when the air distributor 200 as shown in FIG. 5 rotates around the hinge shaft 220 to open each of air passages 230 in the body 210 of the air distributor 200, the air enters the air passages 230 of the slim-type air duct 100 and flows in the air inflow unit 211 in the internal body 210 through the air passages 230 in the body 210 of the air distributor 200. Thereafter, the air in the air inflow unit 211 is divided, by the air passages 230 on the other side of the upper and lower parts in the body 210 of the air distributor 200, into upward and downward directions inside the slim-type air duct 100. Then, the symmetrical airfoil 320 in the air guide 300 induces the air, divided by the air passages 230 into the upward or downward direction and moving in the air outlet 120 direction, to generate the Coanda effect so that the air is discharged forward through the air outlet 120.

On the other hand, as shown in FIG. 6, when the air distributor 200 rotates around the hinge shaft 220 so that the air passage 230 on the other side of the upper part in the body 210 is closed.

The air flowing into the air passages 230 of the slim-type air duct 100 flows into the air inflow unit 211 in the body 210 through the air passages 230 in the body 210 of the air distributor 200. Thereafter, the air flows in the air outlet 120 direction through the air passages 230 in the lower portion of the other side of the body 210, and the air flow is induced to generate the Coanda effect by the symmetrical airfoil 320 in the air guide 300 and discharged upward through the air outlet 120.

In addition, as shown in FIG. 7, when the air distributor 200 rotates around the hinge shaft 220 to close the air passage 230 on the other side of the lower part in the body 210, the air enters the air passage 230 of the slim-type air duct 100 and flows in the air inflow unit 211 in the body 210 through the air passage 230 in the body 210 of the air distributor 200. Thereafter, the air flows in the outlet 120 direction through the air passage 230 on the other side of the upper part in the body 210, and the symmetrical airfoil 320 in the air guide 300 induces the air flowing in the air outlet 120 direction through the air passage 230 to generate a Coanda effect so that the air is discharged downward through the air outlet 120.

As shown in FIG. 8, when the air distributor 200 rotates around the hinge shaft 220 to close each of the air passages 230 in the body 210, the air flowing in the air inlet 110 of the slim-type air duct 100 does not flow in the air inflow unit 211 in the body 210 of the air distributor 200. In addition, the air does not flow in the direction of the air outlet 120.

The invention claimed is:

1. A wind direction controlling device of a slim-type air vent for an automobile, the wind direction controlling device comprising:
a slim-type air duct (100) having an air inlet (110) and an air outlet (120) through which air passes, wherein air generated in by air conditioning device flows in through the air inlet (110) and then is discharged to the outside through the air outlet (120), an air distributor (200) rotatably installed inside the slim-type air duct (100), and an air guide (300) installed and fixed inside the slim-type air duct (100) so that the air distributed by the air distributor is discharged through the air outlet (120) as the Coanda effect is generated in the upward-forward and downward-forward directions,
wherein the air guide (300) has a curved contact surface (310) on one side, curvature of the contact surface (310) is the same as curvature of a body (210) of the air distributor (200) and an airfoil (320) protruding curvedly on the other side,
air passages (230) in the body (210) of the air distributor (200) open and close depending on the position of the air passages (230) in contact with the contact surface (310) of the air guide (300) so that air may be supplied to only one of upper and lower parts of the slim-type air duct (100) or to both the upper and lower parts of the slim-type air duct (100) at the same time.

2. The wind direction controlling device of claim 1, wherein the air distributor (200) comprises a body (200) of a cylindrical shape having an air inflow region (211) through which air flows in, a hinge shaft (200) protruding on both left and right sides of the body (210), and a plurality of air passages (230) penetrating in the lateral direction of the body (210) rotating around the hinge shaft (220).

3. The wind direction controlling device of claim 1, wherein the air distributor (200) is configured to control the volume of air flowing in the slim-type air duct (100) as the air inlet (110) of the slim-type air duct (100) opens and closes depending on the rotating state of the air distributor (200).

* * * * *